Nov. 22, 1966   J. S. ELBOGEN ETAL   3,286,725
HYDRANT PRESSURE REGULATOR

Filed Feb. 2, 1961   4 Sheets-Sheet 1

INVENTORS
JAMES S. ELBOGEN
WILLIAM SEILER, JR.
RALPH H. LEBOW

John N. Wolfram
ATTORNEY

INVENTORS
JAMES S. ELBOGEN
WILLIAM SEILER, JR
RALPH H. LEBOW

John N. Wolfram
ATTORNEY

INVENTORS
JAMES S. ELBOGEN
WILLIAM SEILER, JR.
RALPH H. LEBOW

John N. Wolfram
ATTORNEY

INVENTORS
JAMES S. ELBOGEN
WILLIAM SEILER JR.
RALPH H. LEBOW

John N. Wolfram
ATTORNEY

United States Patent Office 3,286,725
Patented Nov. 22, 1966

3,286,725
HYDRANT PRESSURE REGULATOR
James S. Elbogen, Encino, William Seiler, Jr., Los Angeles, and Ralph H. Lebow, Pacific Palisades, Calif., assignors to Parker-Hannifin Corporation, Cleveland, Ohio, a corporation of Ohio
Filed Feb. 2, 1961, Ser. No. 86,740
33 Claims. (Cl. 137—484.2)

This invention relates to pressure regulators and more particularly to pressure regulartors having a main fluid pressure operated valve controlled by a pilot or servo valve. The pressure regulator herein described and claimed is particularly adaptable for use in the hydrant type fueling system for aircraft but may also be used to advantage in other fluid pressure systems in which it is desired to automatically regulate the pressure of fluid supplied from one part of the system to another.

It is an object of the invention to provide a pressure regulator which will respond quickly to a sudden increase in downstream pressure for throttling or closing the supply line, as may be required.

It is another object to provide a servo controlled pressure regulator valve in which an additional servo valve is utilized to permit faster closing of the main valve upon sudden increase in downstream pressure.

It is another object to provide a servo controlled regulator in which additional fluid from the supply line may be directed through a second servo valve to the rear of the main valve for fast closing of the latter, and in which the second servo valve when closed is substantially balanced against pressure of fluid in the supply line.

It is another object to provide a servo controlled pressure regulator valve in which the servo valve responds to a differential between the regulated downstream pressure and a separately controlled source of pressure for controlling opening and closing of the main valve.

It is another object to provide a main housing for a pressure regulator valve in which the housing is closed at its inlet end by a fluid pressure operated valve and in which a valve operable by external means is provided at the outlet end of said housing.

Figure 1:
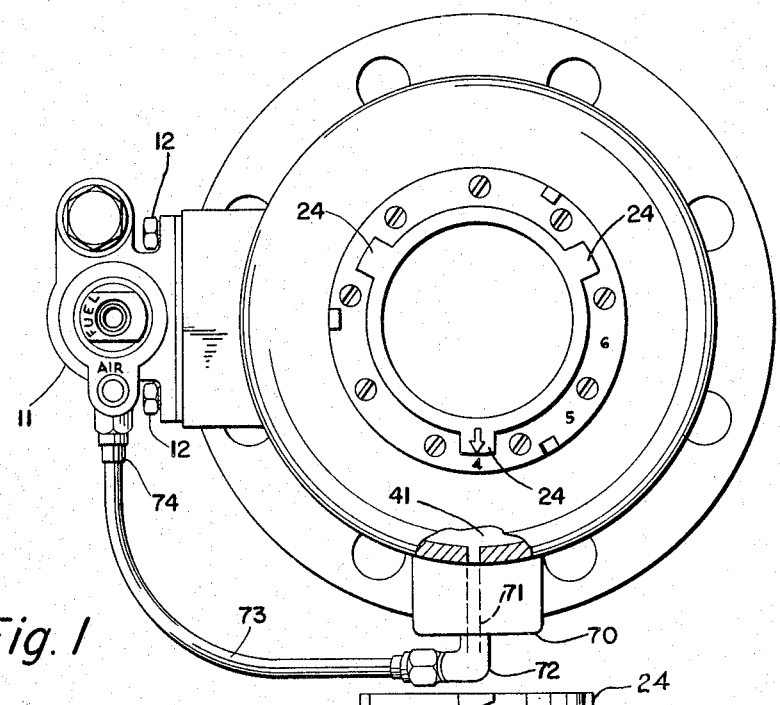
Figure 2:
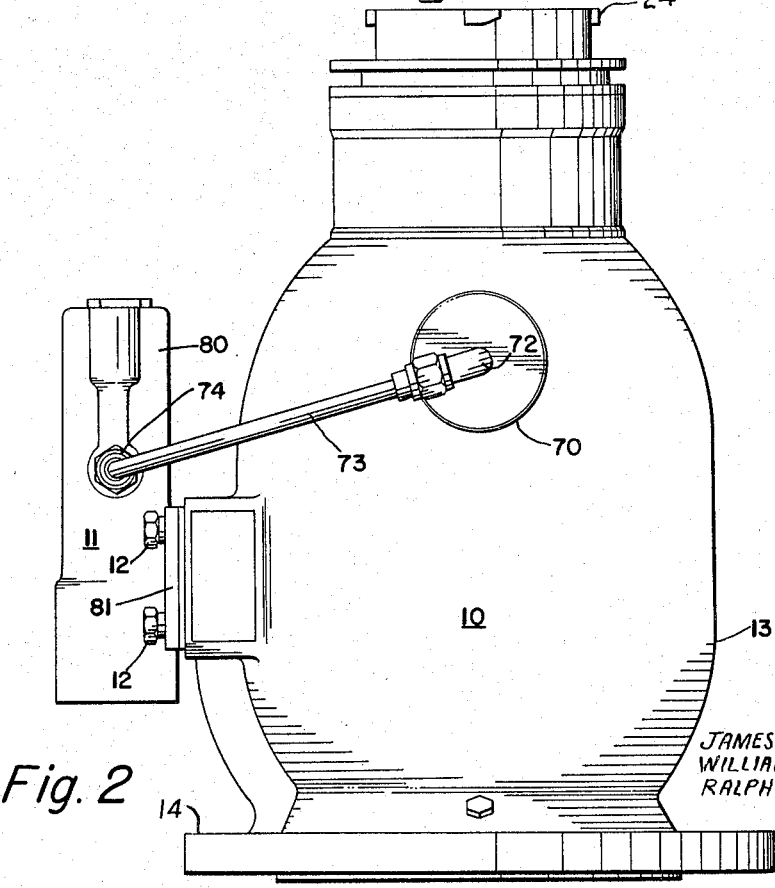
Figure 3:
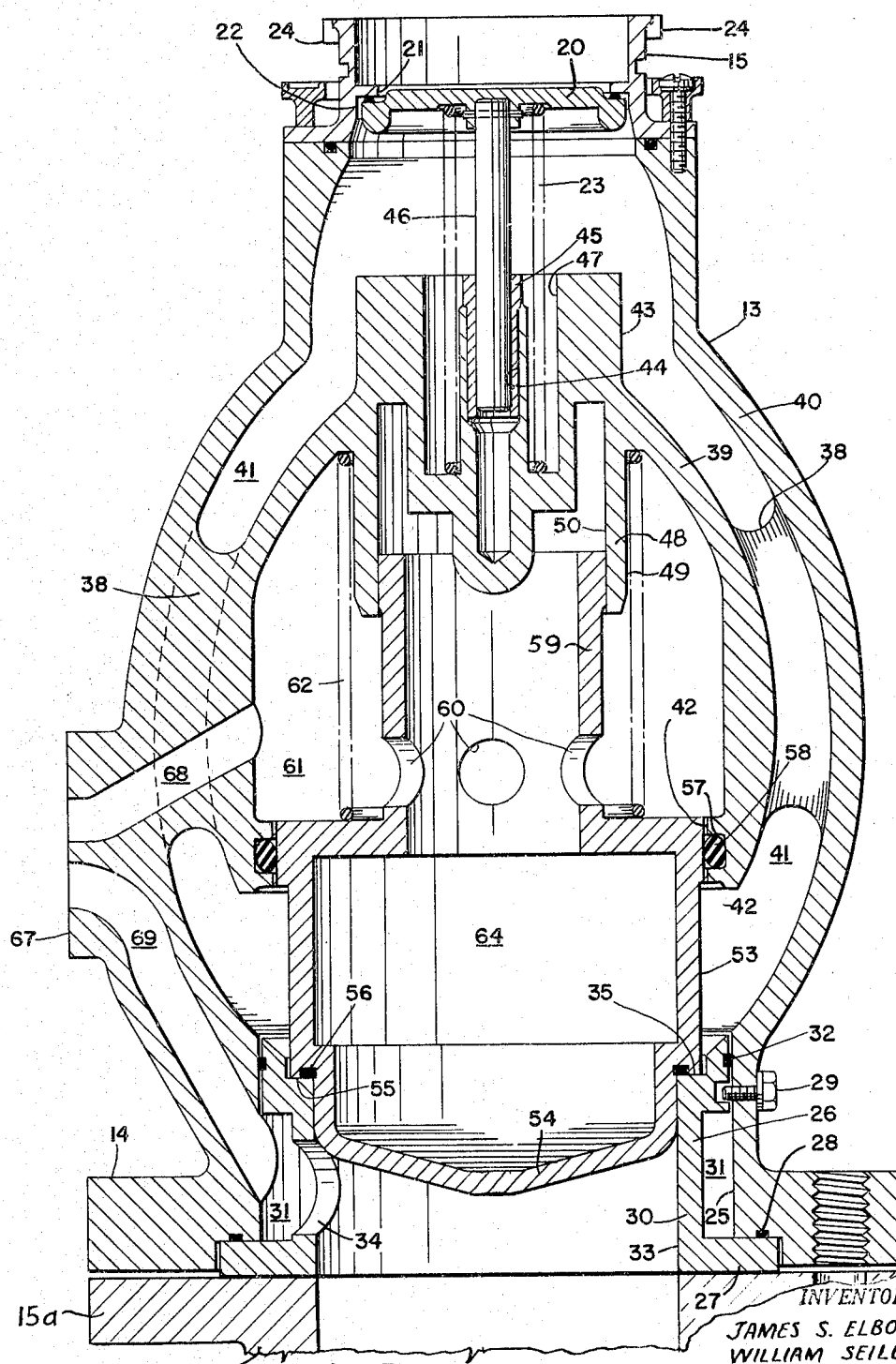
Figure 4:
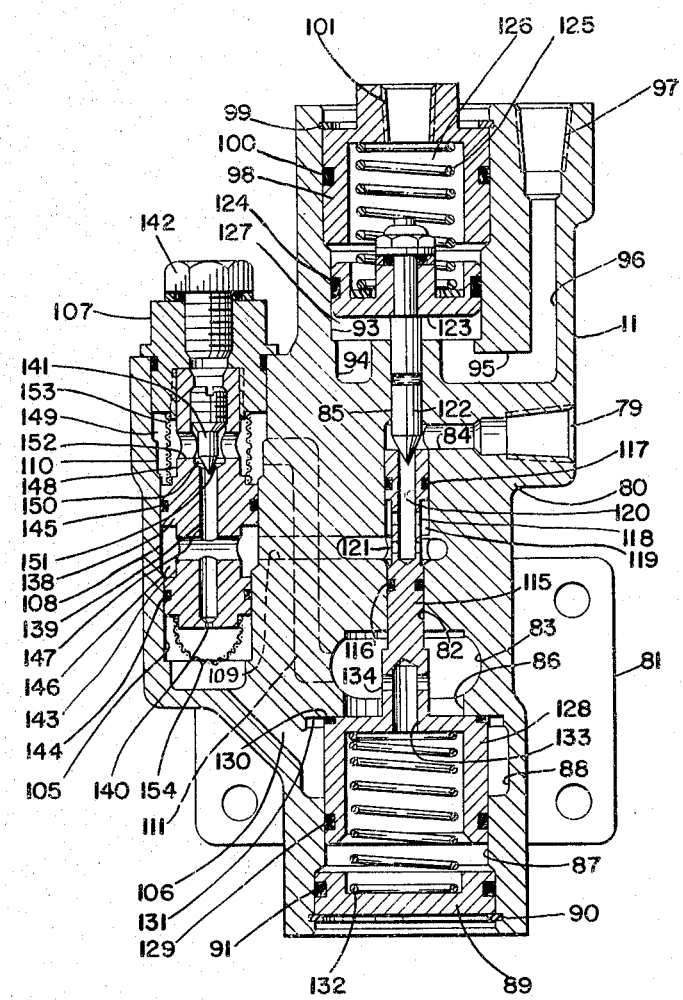
Figure 5:
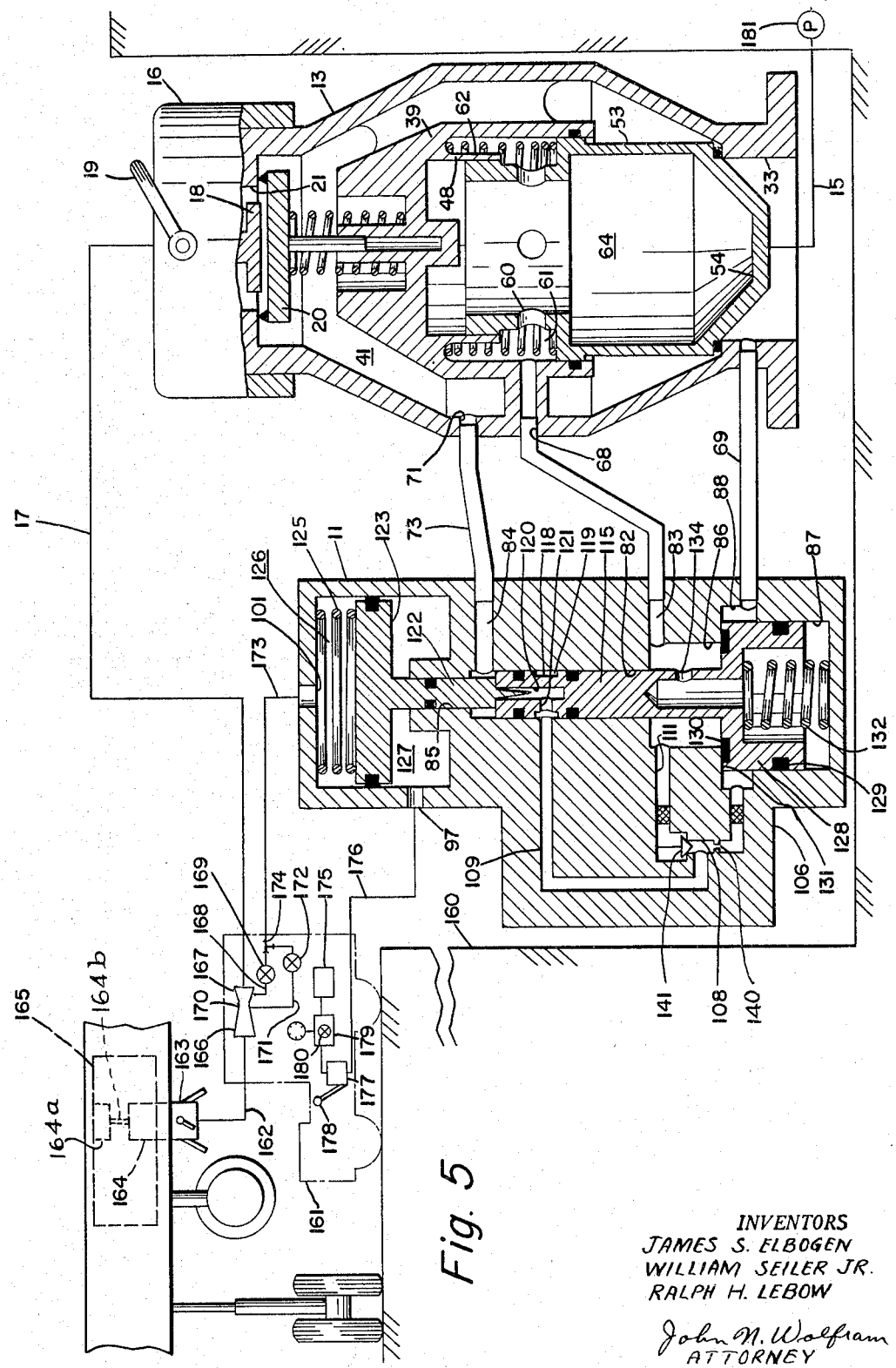

Other objects of the invention will be apparent from the following description and from the drawings in which:

FIG. 1 is a plan view of the pressure regulator.
FIG. 2 is a side elevation of the same.
FIG. 3 is a cross section view of the main valve.
FIG. 4 is a cross section of the pilot or servo valve for controlling the main valve, and
FIG. 5 illustrates a typical use of the pressure regulator in a hydrant refueling system for aircraft and showing the main and servo valves schematically.

The pressure regulator includes a main valve section generally designated 10 and a pilot or servo valve generally designated 11, the two being attached to each other by means of bolts 12.

Main valve 10 includes a housing 13 having a flange 14 at one end thereof for attachment to a source of fluid supply. At the other end it has attached to it an adaptor fitting 15 for connection to a coupler schematically illustrated at 16 in FIG. 5, bayonet lugs 24 being provided for this purpose. The coupler in turn may be attached to a conduit 17 through which fluid may be delivered as will later be described.

The coupler 16 may be of any suitable form but preferably is of the type shown in FIG. 2 of Davies Patent 2,630,822 and includes a coupler valve 18 for opening and closing the coupler through manual actuation of a handle 19. In such case, a poppet valve 20 is provided within housing 13 for closing outlet port 21 provided in adaptor 15 during such times that coupler valve 18 is closed. Poppet valve 20 is normally closed against seat 22 by spring 23 but may be moved to open position by coupler valve 18 when the latter is moved to open position by handle 19.

At the inlet end of main housing section 13 is a cylindrical bore 25 in which is mounted a sleeve 26. This sleeve has a flange 27 which projects slightly beyond the lower surface of flange 14 and which is clamped into seating engagement with a packing 28 when flange 14 is connected to a flange 15a of supply conduit 15b. Prior to such connection screw 29 retains sleeve 26 within bore 25. Sleeve 26 has a cylindrical portion 30 which is spaced from bore 25 so as to form an annular chamber 31 therebetween. This chamber is sealed at its upper end by packing 32 and is communicated with opening 33 of the sleeve by means of radial openings 34. At its upper end sleeve 26 provides a valve seat 35.

Main housing section 13 is formed with a plurality of interior radial ribs 38 which support a generally cup shaped member 39 in spaced relation with outer wall 40 of the housing so as to form an annular flow passage 41 therebetween. The latter leads from inlet opening 33 of sleeve 26 to outlet opening 21 in adaptor 15. The cup shaped member 39 has a cylindrical bore 42 at its lower end and is closed at its opposite end 43. The end 43 has a bore 44 therein for receiving a hollow sleeve 45 which serves as a guide for stem 46 of poppet valve 20. It also has a recess 47 for receiving spring 23. Near the closed end 43 of the cup shaped member 39 is a cylindrical projection 48 having an outer surface 49 and an internal guide surface 50.

Mounted within housing section 13 is a main fluid pressure operated valve member 53 having a hollow interior which is closed at one end by a wall 54 and which is open at its other end. Valve member 53 has a seat surface 55 which is preferably grooved for receiving a packing ring 56 bonded within the groove, the surface 55 and the ring 56 being engageable with seat 35.

Bore 42 has a groove 57 therein for receiving packing 58 which seals valve member 53 with respect to bore 42. The diameter of portion 53 is larger than the diameter of seal portion 56 so as to provide a differential area therebetween.

Valve member 53 has a hollow cylindrical portion 59 projecting from its upper end and receivable within bore 50 so as to be guided thereby. Radial openings 60 connect the interior of valve member 53 with the interior 61 of cup shaped member 39. A spring 62 within chamber 61 normally urges valve member 53 to closed position against seat 35.

The exterior surface of main valve section 13 has a flat portion 67 formed thereon. Surface 67 is communicated with chamber 61 by a passage 68 passing through one of the ribs 38 and is communicated with chamber 31 by a passage 69 formed in the outer wall of main housing 13.

As shown in FIG. 1, there is a boss 70 formed near the upper end of main housing section 13 and having an opening 71 therethrough connecting with passage 41. A fitting 72 is attached to boss 70 for connecting passage 71 with a tube 73 leading to a fitting 74 attached to servo valve unit 11.

Servo valve section 11 includes a housing 80 having a flange 81 adapted to be clamped against surface 67 of main valve section 13. Housing 80 has a cylindrical bore 82 therein which connects with a passage 83 at one end and with a passage 84 and a reduced bore portion 85 at its other end. Passage 84 leads to a port 79 and passage 83 extends transversely of housing 80 through flange 81 so as to connect with passage 68 when servo section 11 is attached to main housing section 13. Passage 83 also communicates with opening 86 which is concentric with bore 82 and which in turn leads to a cylindrical bore 87 having a enlarged chamber portion 88 at its upper end. Bore 87 is closed by a plug 89 held in place by a snap ring 90 and sealed by packing 91.

Reduced bore portion 85 leads to a cylindrical bore 93 which connects with a recess 94 at its lower end and which in turn is connected by passages 95 and 96 with a port 97. Bore 93 is closed by a plug 98 held in place by a snap ring 99 and sealed by packing 100. Plug 98 has a port 101 at its upper end.

Housing 80 has an additional bore 105 therein which connects at its lower end with chamber 88 by means of passage 106. The upper end of bore 105 is closed by plug 107. Bore 105 has a first enlarged portion 108 connected with bore 82 by means of passage 109 and a second enlarged portion 110 connected to passage 83 by passage 111.

Mounted in bore 82 is a stem 115 which is sealed between passages 83 and 109 by a packing 116 and which is sealed between passage 84 and 109 by a packing 117. Intermediate packings 116 and 117 the stem has a reduced diameter portion 118 forming an annular chamber 119 with bore 82. The upper end of the stem has a bore 120 extending thereinto opposite reduced portion 118 and communicating with annular chamber 119 by means of radial openings 121. Mounted within reduced bore portions 85 for opening and closing bore 120 is a needle valve 122 which has a piston 123 attached to its upper end. The piston is sealed within bore 93 by a packing 124. A spring 125 within chamber 126 above piston 123 acts upon the latter to normally urge needle valve 122 into closed position with respect to bore 120.

The lower end of stem 115 is enlarged to form a piston portion 128 slidable within bore 87 and is sealed with respect thereto by packing 129. The upper end of piston portion 128 carries a rubber-like insert 130 which series as a valve face and seats against a transverse valve seat 131 for closing passage 86 with respect to chamber 88. Spring 132 normally urges stem 115 to an upward position with piston 128 seated against valve seat 131. Piston 128 seats on valve seat 131 on a diameter the same as, or slightly less than the outer diameter of packing 129 whereby piston 128 is substantially balanced, or slightly overbalanced in a seating direction by pressure of fluid within bores 86, 87, and 88.

Valve stem 115 towards its lower end also has a bore 133 which with cross drillings 134 connect passage 83 with bore 87 and the lower side of piston 128.

Mounted within bore 105 is a needle valve seat member 138 which is threaded to plug 107. Member 138 has a central bore 139 which communicates with the lower end of bore 105 by means of a restricted orifice 140 whose upper end is controlled by a needle valve 141 threaded into the upper end of member 138. Plug 107 has a central opening normally closed by threaded plug 142 but which plug may be removed to permit adjusted of needle valve 141. Member 138 has a reduced diameter portion 142 between packings 144 and 145 to provide an annular chamber 146 which connects with passage 109 and with bore 139 by means of radial openings 147.

Member 138 also has another reduced diameter portion 148 which provides an annular chamber 149 which connects with passage 111 and also with counterbore 150 above needle valve seat 151 by means of radial openings 152. A screen 153 is interposed between radial openings 152 and passage 111 and another screen 154 is interposed between orifice 140 and passage 106.

In a typical installation at an airport, the main valve housing 13 with the servo valve unit 11 operatively attached thereto, is permanently installed in a hydrant pit 160 at an airport with flange 14 connected to fuel supply pipe 15b. A mobile service truck 161 has provision for carrying another conduit 162 and a nozzle 163 which may be connected to a filling valve 164 in a tank 165 of an airplane. Conduits 17 and 162 may be in the form of flexible hose and are connected by means of a venturi 166. Leading from the inlet end, 167 of the venturi is a sensing conduit 168 having a needle valve 169 therein, and leading from the throat 170 of the venturi is another sensing conduit 171 having another needle valve 172 therein. Both conduits 168 and 171 connect with a conduit 173 by means of a T fitting 174 and conduit 173 is connectible to port 101 of servo valve unit 11.

Truck 161 also carries a source of air under pressure 175 which may be connected to port 97 of servo valve unit 11 by means of a conduit 176. Interposed in conduit 176 is a dead man valve 177 operable to on and off positions by a handle 178, and also a pressure regulator valve 179 having an adjusting means 180 for setting the pressure in conduit 176 to a predetermined value.

When it is desired to transfer fuel from a supply pipe 15 to airplane tank 165, truck 161 is brought into position near hydrant pit 160 and the airplane, nozzle 163 is connected to tank filling valve 164, coupler 16 is connected to adaptor 15 of main valve section 13 and conduits 173 and 176 are connected to ports 101 and 97, respectively.

Venturi tube 166 is for the purpose of compensating for the pressure drop in conduit section 162 and nozzles 163 so that the pressure of fluid in sensing line 173 and hence in chamber 126 will reflect the pressure in nozzle 163. This is a safeguard to prevent fluid from entering tank 165 at a pressure high enough to cause damage thereto.

Pressure regulator 129 is then set to the desired fluid pressure to be delivered through nozzle 163. Nozzle 16 is then opened by manual turning of handle 19. This causes nozzle poppet valve 18 to move downward and unseat poppet valve 20. Nozzle 163 is similarly opened by manual operation and such opening causes adaptor valve 164 to open.

Supply pump 181 is then turned on to deliver fluid from a tank, not shown, through line 15b to inlet port 33 of main valve section 13. At this time, main valve 53 is closed due to the action of spring 61, needle valve 122 is closed by spring 125, and piston 128 is seated on seat 131 by spring 132. Fluid in inlet port 33 passes through openings 34, passage 69, chamber 88, passage 106, orifice 140, needle valve 141, passage 111 and passage 68 into chamber 61. Since needle valve 122 is closed, the fluid is trapped within chamber 61 and interior 64 of valve 53 and exerts a downward pressure on valve element 53, on a greater area than fluid within inlet port 33 acts upwardly on the valve element to hold valve element 53 closed.

To start the flow of fluid, the operator manipulates handle 178 to open valve 177 to permit air under pressure from supply unit 175 to be delivered at the desired regulated pressure to chamber 127. This causes piston 123 and needle valve 122 to raise and open port 120 to connect it with passage 84 which in turn is connected through tube 73 with chamber 41 and the outlet or downstream end of main section 13. Opening of needle valve 122 in the manner just described permits fluid to exhaust from chamber 61 and the interior of the valve element 53 by means of passages 68, 83, 111, needle valve 141, passages 109, 121, 120, needle valve 122, passage 84, tube 73, passage 71, and chamber 41 to outlet port 21. These passages and needle valve openings permit greater flow than orifice 140 and therefore fluid will exhaust from chamber 61 and the interior of valve element 53 faster than it may enter and thus reduce downward pressure on valve element 53 so that the latter moves upwardly to open position by reason of the fluid pressure within inlet port 33. This permits flow from port 33 past valve seat 35 into chamber 41 and through port 21, coupler 16, conduits 17 and 162, and nozzle 163 into tank 165.

As delivery pressure builds up in conduit 17 and venturi 166, the pressures within venturi 166 are transmitted through line 168 and 171 and produce an intermediate pressure in line 173 and hence in chamber 101. As the pressure in chamber 101 approaches the desired regulated pressure as predetermined by pressure regulator 179, piston 123 and needle valve 122 are forced downward to throttle the exhaust flow from chamber 61 through port 120. This causes pressure within chamber 61 and the interior of valve element 53 to build up and start closing movement of valve element 53 with consequent throttling of the flow through main housing 13 to tank 165. At some point of throttled flow the pressure in chamber 126 will counterbalance the fixed air pressure within chamber 127 to stabilize the position of needle valve 122 and valve 53 so as to maintain the desired regulated delivery pressure at nozzle 163.

Although the fluid pressure in chamber 126 is adjusted to represent that at nozzle 163, it may also be considered as representing the fluid pressure at outlet 21 of the main valve since the latter pressure is equal to the fluid pressure at nozzle 163, plus the pressure drop occurring between nozzle 163 and outlet 121. Thus it can be considered that the fluid pressure at outlet 21 is regulated, as well as the fluid pressure at nozzle 163.

When tank 165 is full, flow thereinto may be stopped by automatic closing of valve 164 by action of the float operated pilot vlave 164a. At this time, pressure rise of fluid between regulator valve 13 and filling valve 164 is prevent by closing of valve element 53.

Thus when valve 164 has closed, the pressure at nozzle 163 will tend to increase which in turn will cause an increase of pressure in chamber 126. This causes needle valve 122 to close passage 120 and thereby cutting off the exhausting of fluid from chamber 61. Fluid passing from inlet 33 through orifice 140 raises the fluid pressure within chamber 61 and in the interior of valve 53 and causes complete closure of valve element 53.

Valve 177 is in the nature of a "dead man" control in that it must be manually held to an open position in order for the fueling operation to continue. If it is desired to discontinue fueling before tank 165 is full, handle 178 may be released by the operator to cause valve 177 to close. This drops the pressure within chamber 127 to permit pressure in chamber 126 and spring 125 to move needle valve 122 to its closed position. This results in closing of main valve 53 as already described. To avoid pressure being trapped in chamber 127 upon closing of valve 177, a port may be provided in valve 177 for connecting line 176 to atmosphere upon closing of valve 177. In other words, valve 177 may be a three way valve which in one position connects pressure source 175 to chamber 126 and in another position closes off pressure source 175 and connects chamber 126 to exhaust.

Piston valve 128 serves as a means for directing fluid from inlet port 33 to chamber 61 for rapidly filling the same to quickly close main valve 53 upon closing of needle valve 122 due to closing of tank valve 164, as above described or upon a sudden increase in the delivery pressure at tank 165. In either case the increase of pressure at tank 165 will be reflected back through nozzle 163 and line 162 to venturi 166 where it will cause a rapid increase of pressure in line 173 and chamber 101. This will cause needle valve 122 to move to closed position and then to continue to move downward, carrying stem 115 with it, to unseat piston valve 128 from seat 131. Upon unseating of the latter, fluid from inlet port 33 will pass through openings 34, chamber 31, passages 69, 88, 86, 83, and 68 to chamber 61 where it will rapidly fill the latter and the interior of valve element 53 and cause the valve element to close quickly.

Needle valve 141 is provided for adjusting the rate at which valve element 53 opens. In effect it is a variable orifice which may be utilized for further controlling flow of fluid which has passed through fixed orifice 140 on its way from inlet 33 to chamber 64 so as to vary the rate at which fluid is delivered to the upper side of valve 53.

Thus if there has been a change in the pressure in supply pipe 15b over that for which orifice 140 has been provided, further opening or closing of needle valve 141 will increase or decrease the rate of flow to chamber 64 and correspondingly either slow down or speed up the opening movement of valve 53. Normally, the position of needle valve 141 is adjusted at the factory or upon initial installation of the hydrant regulator. Adjustment may be made by removing plug 142, turning the needle valve with a screw driver, after which plug 142 may be replaced.

It will be obvious that many changes in the detail construction and arrangement of the parts may be made without departing from the invention as described in the claims.

We claim:

1. A pressure regulator comprising a housing having an inlet for high pressure fluid and a main valve for controlling flow of fluid from said inlet through said housing, a pressure chamber in said housing for receiving fluid to apply a closing pressure to said main valve, conduit means including a restricted orifice connecting said inlet to said chamber, a first passage for exhausting fluid from said chamber, a first servo valve in said first passage, means for exerting a predetermined fluid pressure directly upon said first servo valve tending to open said first servo valve, means for directing fluid downstream of said main valve to said first servo valve in opposition to said predetermined fluid pressure whereby said first servo valve will be opened when the pressure of the downstream fluid is less than the predetermined pressure and will be closed when the pressure of the downstream fluid is greater than the predetermined pressure, said first servo valve when open serving to exhaust fluid from said chamber whereby high pressure fluid in said inlet opens said main valve and serving when closed to trap fluid in said chamber whereby high pressure fluid gaining access to said chamber through said orifice will close said main valve, a second passage including portions of said conduit means connecting said inlet to said chamber, a second servo valve for controlling flow of fluid through said second passage, and said means further responsive to downstream pressure greater than said predetermined pressure for opening said second servo valve to permit additional flow of high pressure fluid from said inlet to said chamber for closing said main valve.

2. A pressure regulator in accordance with claim 1 in which said second servo valve has a greater flow capacity than said first servo valve whereby it permits faster closing of said main valve than does said first servo valve.

3. A pressure regulator in accordance with claim 1 in which said second servo valve is exposed to pressure of fluid in said inlet and is substantially balanced with respect thereby whereby said second servo valve is substantially insensitive to inlet pressure.

4. A pressure regulator in accordance with claim 1 in which said second servo valve has an effective area subject to pressure in said chamber for applying a closing force to said second servo valve.

5. A pressure regulator in accordance with claim 1 in which said second servo valve has a part engageable by said first servo valve whereby said second servo valve is movable to open position by said first servo valve.

6. A pressure regulator in accordance with claim 5 in which said first passage includes an opening through said part and said opening is closed by said engagement.

7. A pressure regulator in accordance with claim 1 in which said second servo valve is engageable by said first servo valve when the latter is closed and is movable thereby into open position when the pressure of fluid acting on said other area exceeds the pressure of fluid acting on said first area by a predetermined amount.

8. A pressure regulator in accordance with claim 1 in which a variable restrictor valve is interposed in said first passage between said chamber and said first servo valve for varying the rate at which fluid may exhaust through said first passage and thereby control the speed with which said main valve opens.

9. A pressure regulator in accordance with claim 1 in which said second passage includes a bypass passage which bypasses said restricted orifice, and said second servo valve controls flow of fluid through said bypass passage.

10. A pressure regulator in accordance with claim 9 in which said conduit means includes a variable restricted orifice and said bypass passage bypasses said variable restricted orifice.

11. A pressure regulator in accordance with claim 1 in which there is an adjustable valve mounted in said first passage for controlling the flow rate therethrough.

12. A pressure regulator in accordance with claim 1 in which said second passage is of larger flow capacity than said restricted orifice whereby fluid from said inlet will flow faster through said second passage for filling said chamber through said orifice.

13. A pressure regulator in accordance with claim 1 in which said second servo valve is spring pressed toward its closed position.

14. A pressure regulator in accordance with claim 1 in which said first servo valve is engageable with said second servo valve and there is a first spring which when the servo valves are engaged, urges said first servo valve toward closed position and said second servo valve toward open position, and there is a second spring stronger than said first spring and urging said second servo valve toward closed position.

15. A servo device for use with a main valve unit having an inlet, a fluid pressure operated valve member for controlling flow of fluid from said inlet through said unit, and a pressure chamber to receive fluid under pressure for applying a closing force to said valve member, said device comprising a housing having a first passage with one end adapted to be connected to said unit downstream of said valve member and another end adapted to connect with said chamber, a first servo valve for opening and closing said first passage, means connectible downstream of said valve member and responsive to the pressure of downstream fluid for applying a closing force to said first servo valve, means for applying a predetermined opening force on said first servo valve in opposition to said closing force, a second passage in said housing with one end adapted to connect with said chamber and another end adapted to connect with said inlet, a second servo valve for opening and closing said second passage, means for applying a closing force to said second servo valve, said first passage including an opening through a part of said second servo valve, said first servo valve being adapted to open and close said opening, and means for transmitting said closing force applied to said first servo valve to said second servo valve as an opening force therefor.

16. A servo device in accordance with claim 15 in which both said servo valves are spring closed when not subject to fluid pressures.

17. A servo device in accordance with claim 15 in which each of said servo valves is spring closed when not subject to fluid pressure and said springs act in opposition to each other, the spring for closing said second servo valve being stronger than the spring for closing said first servo valve.

18. A servo device for use with a main valve having an inlet, an outlet, a fluid pressure operated valve member and a pressure chamber to receive fluid under pressure for applying a closing force to said valve member, said device comprising a housing having a bore, a first chamber at one end of the bore and a second chamber at the other end of the bore, a valve seat in said second chamber and surrounding said bore, a first valve member in said bore and operatively connected to a piston which divides said first chamber into upper and lower sections, a second valve member in said bore having a first portion spaced from said opposite end of said bore to provide a passage therebetween and having a portion projecting into said second chamber and dividing it into first and second sections, said second valve member having a part cooperable with said seat for opening and closing communication between said first passage and said first section, a first passageway leading from said upper chamber and adapted to be connected to said outlet, a second passageway leading from one end of said bore and adapted to be connected to said outlet, a third passageway intersecting the opposite end of said bore and adapted to be connected to said pressure chamber, a fourth passageway leading from said first section and adapted to be connected to said inlet, a second passage adapted to connect the opposite ends of said bore, at least a portion of said second passage being in said second valve member, said first valve member being engageable with said second valve member for closing said second passage, said second valve member being movable to open position by said first valve member when the force exerted therefrom by fluid pressure in said upper chamber is greater than the sum of the net force tending to close said second valve member and the forces tending to open said first valve member.

19. A servo device in accordance with claim 18 in which there is a fifth passageway leading from said lower chamber and adapted for connection to a source of fluid pressure for applying a force to said piston for urging said first valve to open position.

20. A servo device in accordance with claim 18 in which there is an additional passage for connecting said third passageway with said second chamber for applying fluid pressure from said pressure chamber to said second valve member for urging the same toward closed position.

21. A servo device in accordance with claim 18 in which both said servo valves are spring closed when not subjected to fluid pressure.

22. A servo device in accordance with claim 18 in which there is an additional passage connecting said upper section with said second passageway and there is a restricted orifice in said additional passage.

23. A servo device in accordance with claim 18 in which there is a variable throttling valve for controlling flow of fluid through said second passageway.

24. In a fluid delivery system a source of fluid under pressure, a delivery conduit and having upstream and downstream ends, a main fluid pressure operated valve for controlling the flow of fluid from said source to the downstream end of said delivery conduit, a servo valve for controlling said fluid pressure operated valve, means for supplying air under pressure to said servo valve for applying an opening force thereto, fluid pressure means for applying a closing force to said servo valve in opposition to said opening force, said fluid pressure means including a bypass line for directing fluid under pressure from an intermediate portion of said delivery conduit to said servo valve, and compensating means for reducing and thus regulating the pressure of fluid within said bypass line so that it is substantially the same as the pressure of fluid at the downstream end of said conduit.

25. A system in accordance with claim 24 in which there is a means for regulating the pressure of said air.

26. A system in accordance with claim 24 in which said compensating means includes a venturi in said delivery conduit, fluid lines connecting the upstream end and the throat of the venturi with said bypass line, and valves in said fluid lines for adjusting the flow capacity therethrough.

27. In a fluid delivery system, a source of fluid under pressure, a delivery conduit having upstream and downstream ends, a main valve for controlling the flow of fluid from said source to the upstream end of said delivery conduit, said main valve comprising a housing having a fluid passage therethrough and a fluid pressure operated valve for opening and closing said passage, a pressure chamber in said housing for receiving fluid for applying a closing pressure to said valve, said housing having a bore at the inlet end of said passage, a hollow sleeve mounted in said bore, the interior of said sleeve constituting a part of said passage through the housing, said sleeve having at its inner end a seat for said valve, said sleeve having a portion radially spaced from said bore to provide an annular chamber therebetween, passage means communicating the interior of the sleeve with said annular chamber, another passage means connecting said annular chamber with said pressure chamber whereby fluid from said inlet end of said housing may be directed to said pressure chamber for closing said valve, means for exhausting fluid from said pressure chamber to permit said valve to be opened by pressure of fluid within said sleeve, a servo device for controlling said fluid pressure operated valve, means for supplying air under pressure to said servo valve for applying an opening force thereto, fluid pressure means for applying a closing force to said servo valve in opposition to said opening force, said fluid pressure means including a bypass line for directing fluid under pressure from an intermediate portion of said delivery conduit to said servo valve, and compensating means for reducing and thus regulating the pressure of fluid within said bypass line so that it is substantially the same as the pressure of fluid at the upstream end of said conduit.

28. In a fluid delivery system, a source of fluid under pressure, a delivery conduit having upstream and downstream ends, a main fluid pressure operated valve for controlling the flow of fluid from said source to the upstream end of said delivery conduit, said main valve comprising a housing having a fluid passage therethrough and a fluid pressure operated main valve for opening and closing said passage, a pressure chamber in said housing for receiving fluid for applying a closing pressure to said main valve, said housing having a bore at the inlet end of said passage, a hollow sleeve mounted in said bore, the interior of said sleeve constituting a part of said passage through the housing, said sleeve having at its inner end a seat for said main valve, said sleeve having a portion radially spaced from said bore to provide an annular chamber therebetween, passage means communicating the interior of the sleeve with said annular chamber, another passage means connecting said annular chamber with said pressure chamber whereby fluid from said inlet end of said housing may be directed to said pressure chamber for closing said main valve, means for exhausting fluid from said pressure chamber to permit said main valve to be opened by pressure of fluid within said sleeve, a servo device for controlling said fluid pressure operated valve, said servo device comprising a housing having a first passageway with one end adapted to be connected to said unit downstream of said valve member and another end adapted to connect with said chamber, a first servo valve for opening and closing said first passageway, means connectible downstream of said valve member and responsive to the pressure of downstream fluid for applying a closing force to said first servo valve, means for applying a predetermined opening force on said first servo valve in opposition to said closing force, a second passageway in said housing with one end adapted to connect with said chamber and another end adapted to connect with said inlet, a second servo valve for opening and closing said second passageway, means for applying a closing force to said second servo valve and means for transmitting said closing force applied to said first servo valve to said second servo valve as an opening force therefor, means for supplying air under pressure to said servo valve for applying an opening force thereto, fluid pressure means for applying a closing force to said servo valve in opposition to said opening force, said fluid pressure means including a bypass line for directing fluid under pressure from an intermediate portion of said delivery conduit to said servo valve, and compensating means for regulating the pressure of fluid within said bypass line so that it is substantially the same as the pressure of fluid at the upstream end of said conduit.

29. A pressure regulator comprising a housing having an inlet for high pressure fluid and a main valve for controlling the flow of fluid from said inlet through said housing, a first restricted orifice, a first passage leading from said inlet to said first restricted orifice, a pressure chamber in said housing for receiving fluid to apply a closing pressure to said main valve, a second restricted orifice, a second passage leading from said second restricted orifice to said chamber, said first and second passages forming an inlet conduit for directing fluid from said inlet to said pressure chamber so as to effect closing of said main valve, a third passage connecting said first and second passage intermediate said first and second restricted orifices, a servo valve in said third passage, means responsive to the fluid pressure downstream of said main valve for opening and closing said servo valve, said second restricted orifice having a greater flow capacity than said first restricted orifice, said second and third passages further forming an exhaust conduit for exhausting fluid from said chamber whereupon the opening and closing movements of said servo valve control the opening and closing movements of said main valve.

30. A pressure regulator comprising a housing having an inlet for high pressure fluid and a main valve for controlling the flow of fluid from said inlet through said housing, a first restricted orifice, a first passage leading from said inlet to said first restricted orifice, a pressure chamber in said housing for receiving fluid to apply a closing pressure to said main valve, a second restricted orifice, a second passage leading from said second restricted orifice to said chamber, said first and second passages forming an inlet conduit for directing fluid from said inlet to said pressure chamber so as to effect closing of said main valve, a third passage connecting said first and second passage intermediate said first and second restricted orifices, a first servo valve in said third passage, first means responsive when the pressure of fluid downstream of said main valve exceeds a predetermined pressure for closing said first servo valve and responsive when the pressure of fluid downstream of said main valve is less than said predetermined pressure for opening said first servo valve, said second restricted orifice having a greater flow capacity than said first restricted orifice, said second and third passages forming an exhaust conduit whereupon the opening of said first servo valve permits fluid to be exhausted from said chamber through said second and third passages at a faster rate than the fluid enters said chamber through said first and second passages, a second servo valve in said first passage, a fourth passage between said first and second passages by-passing said first and second restricted orifices, said second servo value maintaining said fourth passage closed at downstream pressures up to said predetermined pressure, and said first means being responsive to downstream pressure greater than said predetermined pressure for opening said second servo valve to permit additional flow of high pressure fluid from said inlet to said chamber through said fourth passage for closing said main valve.

31. A pressure regulator comprising a housing having an inlet for high pressure fluid and a main valve for controlling flow of fluid from said inlet through said housing, a pressure chamber in said housing for receiving fluid to apply a closing pressure to said main valve, conduit means including a restricted orifice connecting said inlet to said chamber, a first passage for exhausting fluid from said chamber, a first servo valve in said first passage, means for exerting a predetermined fluid pressure directly on said first servo valve tending to open said first servo valve, means responsive when the pressure of fluid downstream of said main valve exceeds said predetermined pressure for closing said first servo valve and said predetermined fluid pressure being responsive when the pressure of fluid downstream of said main valve is less than said predetermined pressure for opening said first servo valve, said first servo valve when open serving to exhaust fluid from said chamber whereby high pressure fluid in said inlet opens said main valve and serving when closed to trap fluid in said chamber whereby high pressure fluid gaining access to said chamber through said orifice will close said main valve, a second passage connecting said inlet to said chamber, a second servo valve for controlling flow of fluid through said second passage and said means being responsive to downstream pressure greater than said predetermined pressure for opening said second servo valve to permit a large quantity flow of high pressure fluid from said inlet to said chamber through said second servo valve for quickly closing said main valve.

32. A pressure regulator comprising a housing having an inlet for high pressure fluid and a main valve for controlling flow of fluid from said inlet through said housing, a pressure chamber in said housing for receiving fluid to apply a closing pressure to said main valve, conduit means including a restricted orifice connecting said inlet to said chamber, a first passage for exhausting fluid from said chamber, a first servo valve in said first passage, means for exerting a predetermined fluid pressure directly on said first servo valve tending to open said first servo valve, pressure responsive means responsive when the pressure of fluid downstream of said main valve exceeds said predetermined pressure for closing said first servo valve and said predetermined fluid pressure being responsive when the pressure of fluid downstream of said main valve is less than said predetermined pressure for opening said first servo valve, said first servo valve when open serving to exhaust fluid from said chamber whereby high pressure fluid in said inlet opens said main valve and serving when closing to trap fluid in said chamber whereby high pressure fluid gaining access to said chamber through said orifice will close said main valve, a second passage including portions of said conduit means connecting said inlet to said chamber, a second servo valve for controlling flow of fluid through said second passage, and said pressure responsive means being responsive to downstream pressure greater than said predetermined pressure for opening said second servo valve to permit additional flow of high pressure fluid from said inlet to said chamber for closing said main valve.

33. A pressure regulator comprising a housing having an inlet for high pressure fluid and a main valve for controlling flow of fluid from said inlet through said housing, a pressure chamber in said housing for receiving fluid to apply a closing pressure to said main valve, conduit means including a restricted orifice connecting said inlet to said chamber, a first passage for exhausting fluid from said chamber, a first servo valve in said first passage, first means for selectively exerting a predetermined fluid pressure from a separate source directly on said first servo valve tending to open said first servo valve, second means responsive when the pressure of fluid downstream of said main valve exceeds said predetermined pressure for closing said first servo valve and said predetermined fluid pressure functioning to open said first servo valve when the pressure of fluid downstream of said main valve is less than said predetermined pressure, said first servo valve when open serving to exhaust fluid from said chamber whereby high pressure fluid in said inlet opens said main valve and serving when closed to trap fluid in said chamber whereby high pressure fluid gaining access to said chamber through said orifice will close said main valve, a second passage connecting said inlet to said chamber, a second servo valve for controlling flow of fluid through said second passage, and said second means being further responsive to downstream pressure greater than said predetermined pressure for opening said second servo valve to permit a large quantity flow of high pressure fluid from said inlet to said chamber through said second servo valve for quickly closing said main valve.

References Cited by the Examiner

UNITED STATES PATENTS

| | | | |
|---|---|---|---|
| 868,219 | 10/1907 | Brown et al. | 137—505.38 |
| 869,830 | 10/1907 | Dalen | 137—484.2 |
| 1,503,664 | 8/1924 | Richardson | 137—484.2 |
| 1,631,059 | 5/1927 | Price | 137—220 |
| 1,664,493 | 4/1928 | Smith | 137—488 |
| 1,723,736 | 8/1929 | Kruse | 137—220 |
| 1,887,322 | 11/1932 | Nettleton | 137—82 |
| 2,054,464 | 9/1936 | Johnson | 137—82 |
| 2,771,905 | 11/1956 | Griswold | 137—488 |
| 3,003,516 | 10/1961 | Grandberg et al. | 137—220 |
| 3,013,432 | 12/1961 | O'Keeffe | 73—203 X |

FOREIGN PATENTS 1,080,800  12/1954  France.

WILLIAM F. O'DEA, *Primary Examiner.*

M. CARY NELSON, MARTIN P. SCHWADRON,
*Examiners.*

A. JAFFE, A. COHAN, *Assistant Examiners.*